May 26, 1931.　　　G. MALETZ　　　1,806,812
TWINE HOLDING AND DISPENSING DEVICE
Filed July 21, 1930
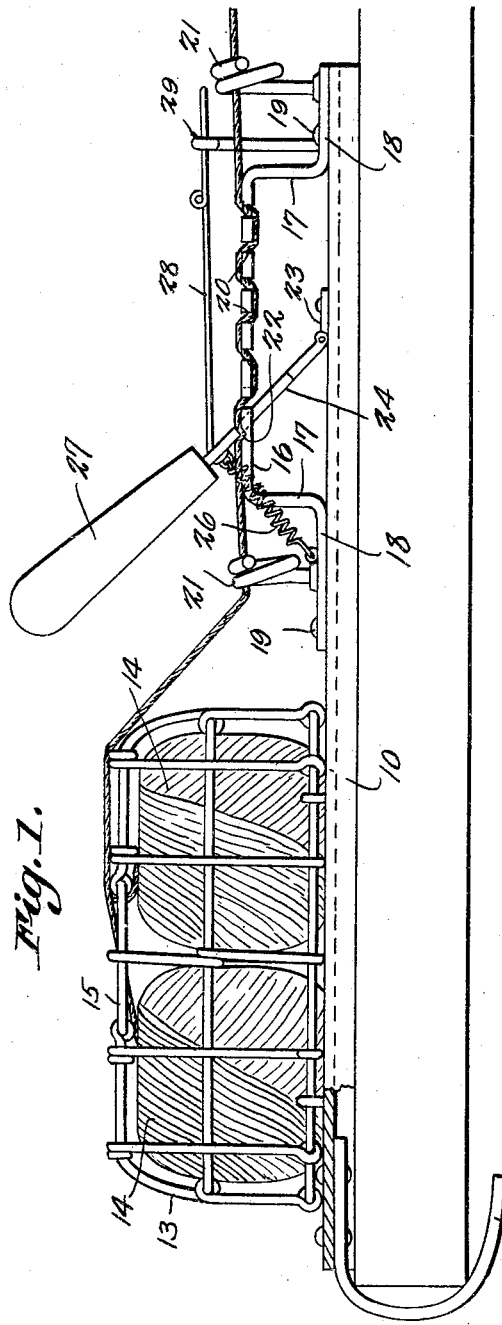
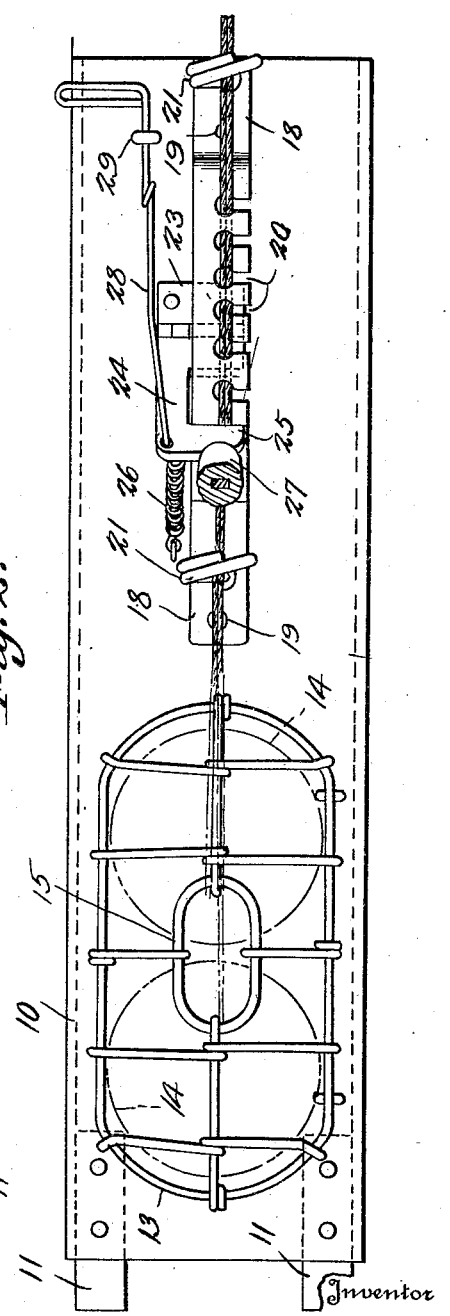

Patented May 26, 1931

1,806,812

UNITED STATES PATENT OFFICE

GUIDO MALETZ, OF BALTIMORE, MARYLAND

TWINE HOLDING AND DISPENSING DEVICE

Application filed July 21, 1930. Serial No. 469,338.

This invention relates to twine holding and dispensing devices and has special reference to a device of this description for dispensing two strands of twine simultaneously.

In the preparation of large sausages it is customary, after the skin has been filled to the required extent, to close the end of the skin against the sausage meat by tying twine tightly therearound and, so that a suspension loop may be formed, it is preferred to use a double strand of twine which is passed around the end of the sausage just as if a single strand were employed and the ends tied together, an ordinary single knot being tied in one end of the double strand to unite the two strands and thus form a suspension loop.

One important object of this invention is to provide a novel form of twine holder arranged to hold and dispense a double strand of twine.

In tying sausage in the manner above described it is necessary to draw the twine tightly about the sausage and this can best be effected by holding one end of the double strand by mechanical means so that the operator may have both hands free to grasp and pull on the other end of the double strand and for suitably knotting the doubled strand after it has been drawn tight.

A second important object of the invention is to provide, in a device of this description, novel means for automatically clamping the strands from withdrawal after the required amount for tying the sausage has been drawn off.

With the above and other objects in view, the invention consists in general of certain novel details of construction and combinations of parts hereinafter fully described, illustrated in the accompanying drawings, and specifically claimed.

In the accompanying drawings, like characters of reference indicate like parts in the several views, and:

Figure 1 is a side elevation of the improved device;

Figure 2 is a plan view thereof partly in section.

In the present embodiment of the invention, a base 10 is provided and hooks 11 are arranged at one end of this base so that the device may be placed on a table 12 or the like with the hooks engaged under the edge to hold the device in position. A wire ball cage 13 is arranged at the end of the base near the hooks and is of sufficient size to accommodate two balls 14 of twine, the twine being led off these balls and out of the cage through a guide ring 15. At the forward end of the base and extending longitudinally thereof is a plate 16 supported in spaced relation above the base by legs 17 having feet 18 which rest on the base and are secured thereto by screws 19. Extending inwardly from one edge of the plate 16 are spaced slots 20 having enlarged inner ends. Wire twine guides 21 extend upward from the feet 18 and the two strands of twine are led first through the eye or guide 21 nearest the balls 14, then up and down through the slots 20 as best seen in Figure 1, and finally through the other guide 21. Between the first guide 21 and the nearest notch 20 the plate 16 has a transverse groove 22, formed transversely of its upper face. Secured to the base 10 about centrally of the plate 16 is one leaf of a hinge member 23, the other leaf being free to swing and carrying an arm 24 having a finger 25 adapted to grip the strands and force them into the groove 22 upon the arm being drawn towards the twine cage by a spring 26. A handle 27 is provided for this arm and a pull rod 28 is also connected to the arm and passes forwardly through an eye 29. By means either of the pull rod or handle the arm may be drawn forward and the finger released from the twine so that it may be drawn off by pulling the free ends of the strands.

In use the arm is moved forwardly and a sufficient length of the two strands is drawn off after which the arm is released to grip the twine and prevent any more from being drawn off. The loose twine is then passed around the sausage with the two strands together. A single knot is then formed so that the loop or bight of the knot surrounds the sausage. The free ends of the strands are now pulled strongly away from the holder until the skin is closed on the sausage meat after which a second single knot is tied to complete the fastening of the twine about the sausage. The strands are then cut off close to the holder and a single knot is tied in this end to unite the strands and form a loop by which the sausage may be hung up.

There has thus been provided a simple and efficient device of the kind described and for the purpose specified.

It is obvious that minor changes may be made in the form and construction of the device without departing from the principles involved. It is therefore desired to include, as the invention, all forms which properly come within the scope claimed.

Having thus described the invention, what is claimed is:

1. In a twine holder, a base, a plate supported from the base in spaced relation above the same, a holder for holding a plurality of balls of twine, said plate having slots therein to permit the twine to pass through the plate along a crenellated path, an arm pivoted to said base, a spring normally holding said arm inclined rearwardly towards the holder, and a finger carried by the arm and projecting over the plate, said plate having a groove therein wherewith the finger cooperates to clamp the twine.

2. In a twine holder, a base, a plate supported from the base in spaced relation above the same, a holder for holding a plurality of balls of twine, said plate having slots therein to permit the twine to pass through the plate along a crenellated path, an arm pivoted to said base, a spring normally holding said arm inclined rearwardly towards the holder, a finger carried by the arm and projecting over the plate, said plate having a groove therein wherewith the finger cooperates to clamp the twine, and guide eyes at the ends of said plate.

In testimony whereof I affix my signature.

GUIDO MALETZ.